(12) United States Patent
Kurita et al.

(10) Patent No.: US 8,391,178 B2
(45) Date of Patent: Mar. 5, 2013

(54) ROUTE ALLOCATION APPARATUS AND METHOD

(75) Inventors: Toshihiko Kurita, Kawasaki (JP); Hideki Mitsunobu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 13/017,423

(22) Filed: Jan. 31, 2011

(65) Prior Publication Data

US 2011/0206034 A1 Aug. 25, 2011

(30) Foreign Application Priority Data

Feb. 24, 2010 (JP) ................................. 2010-038141

(51) Int. Cl.
*H04L 12/56* (2006.01)
(52) U.S. Cl. .......................... 370/252; 370/401; 370/458
(58) Field of Classification Search ........................ None
See application file for complete search history.

(56) References Cited

U.S. PATENT DOCUMENTS

| 2002/0027896 | A1* | 3/2002 | Hughes et al. | 370/342 |
| 2004/0032487 | A1* | 2/2004 | Chu et al. | 348/14.09 |
| 2008/0259954 | A1* | 10/2008 | Sahni et al. | 370/468 |
| 2010/0142545 | A1* | 6/2010 | Kurita | 370/401 |
| 2010/0226251 | A1* | 9/2010 | Imai et al. | 370/235 |
| 2011/0292949 | A1* | 12/2011 | Hayashi et al. | 370/419 |

FOREIGN PATENT DOCUMENTS

| JP | 11-239181 A | 8/1999 |
| JP | 2002-247092 A | 8/2002 |

* cited by examiner

*Primary Examiner* — Michael J Moore, Jr.
*Assistant Examiner* — Duc Duong
(74) *Attorney, Agent, or Firm* — Fujitsu Patent Center

(57) ABSTRACT

A route allocation apparatus includes a route calculation section and a route allocation controller. The route calculation section calculates a route between an outgoing edge node and incoming edge node within a network. The route allocation controller allocates the route to communication slots. Further, the route allocation controller calculates an expected value as an index of the number of the routes allocatable to the communication slots, selects a route allocation in which the expected value is a maximum, obtains the number of the routes allocatable to the selected communication slots after the route allocation, and updates the expected value.

9 Claims, 26 Drawing Sheets

| ROUTE NUMBER | (1) | (2) | (3) | (4) | (5) | (6) | (7) | (8) | (9) | (10) | (11) | (12) |
|---|---|---|---|---|---|---|---|---|---|---|---|---|
| START EDGE | 1 | 1 | 1 | 2 | 2 | 2 | 3 | 3 | 3 | 4 | 4 | 4 |
| END EDGE | 2 | 3 | 4 | 1 | 3 | 4 | 1 | 2 | 4 | 1 | 2 | 3 |

SLOT s1

THE NUMBER OF
ALLOCATABLE ROUTES = 7

SLOT s2

THE NUMBER OF
ALLOCATABLE ROUTES = 7 aj T1a ROUTE ALLOCATION NUMBER TABLE

| SLOT | 1 | 2 | 3 | 4 |
|---|---|---|---|---|
| THE NUMBER OF ALLOCATED ROUTES | 7 | 7 | 6 | 12 |

FIG. 7

T1b ROUTE ALLOCATION NUMBER TABLE $b_{i,j}$

| ROUTE \ SLOT | 1 | 2 | 3 | 4 |
|---|---|---|---|---|
| (1) | 0 | 0 | 0 | 7 |
| (2) | 0 | 0 | 0 | 6 |
| ⋮ | ⋮ | ⋮ | ⋮ | ⋮ |
| (12) | 4 | 4 | 0 | 7 |

FIG. 8 eij    T2 EXPECTED VALUE TABLE

| ROUTE \ SLOT | 1 | 2 | 3 | 4 |
|---|---|---|---|---|
| (1) | 0 | 0 | 0 | 0.56 |
| (2) | 0 | 0 | 0 | 0.56 |
| ⋮ | ⋮ | ⋮ | ⋮ | ⋮ |
| (12) | 0.60 | 0.60 | 0 | 0.54 |

FIG. 9

T1a-1 ROUTE ALLOCATION NUMBER TABLE aj

| SLOT | 1 | 2 | 3 | 4 |
|---|---|---|---|---|
| THE NUMBER OF ALLOCATED ROUTES | 7 | 7 | 6 | 7 |

FIG. 10 bij  T1b-1 ROUTE ALLOCATION NUMBER TABLE

| SLOT / ROUTE | 1 | 2 | 3 | 4 |
|---|---|---|---|---|
| (1) | 0 | 0 | 0 | 0 |
| (2) | 0 | 0 | 0 | 0 |
| ⋮ | ⋮ | ⋮ | ⋮ | ⋮ |
| (12) | 4 | 4 | 0 | 4 |

T2-1 EXPECTED VALUE TABLE

| SLOT<br>ROUTE | 1 | 2 | 3 | 4 |
|---|---|---|---|---|
| (1) | 0 | 0 | 0 | 0 |
| (2) | 0 | 0 | 0 | 0 |
| ⋮ | ⋮ | ⋮ | ⋮ | ⋮ |
| (12) | 0.50 | 0.50 | 0.50 | 0.50 |

FIG. 12

WAVELENGTH λ3

THE NUMBER OF
ALLOCATABLE ROUTES = 6

WAVELENGTH λ4

THE NUMBER OF
ALLOCATABLE ROUTES = 12 aj

T11a ROUTE ALLOCATION NUMBER TABLE

| WAVELENGTH | 1 | 2 | 3 | 4 |
|---|---|---|---|---|
| ROUTE ALLOCATION NUMBER | 7 | 7 | 6 | 12 |

FIG. 19 bi,j

T11b ROUTE ALLOCATION NUMBER TABLE

| ROUTE \ WAVELENGTH | 1 | 2 | 3 | 4 |
|---|---|---|---|---|
| (1) | 0 | 0 | 0 | 7 |
| (2) | 0 | 0 | 0 | 6 |
| ⋮ | ⋮ | ⋮ | ⋮ | ⋮ |
| (12) | 4 | 4 | 0 | 7 |

T22 EXPECTED VALUE TABLE

| ROUTE \ WAVELENGTH | 1 | 2 | 3 | 4 |
|---|---|---|---|---|
| (1) | 0 | 0 | 0 | 0.56 |
| (2) | 0 | 0 | 0 | 0.56 |
| ⋮ | ⋮ | ⋮ | ⋮ | ⋮ |
| (12) | 0.60 | 0.60 | 0 | 0.54 |

FIG. 21 aj

T11a-1 ROUTE ALLOCATION NUMBER TABLE

| WAVELENGTH | 1 | 2 | 3 | 4 |
|---|---|---|---|---|
| ROUTE ALLOCATION NUMBE | 7 | 7 | 6 | 7 |

FIG. 22

| bij ROUTE \ WAVELENGTH | 1 | 2 | 3 | 4 |
|---|---|---|---|---|
| (1) | 0 | 0 | 0 | 0 |
| (2) | 0 | 0 | 0 | 0 |
| ⋮ | ⋮ | ⋮ | ⋮ | ⋮ |
| (12) | 4 | 4 | 0 | 4 |

T11b-1 ROUTE ALLOCATION NUMBER TABLE

FIG. 23 ei,j
T22-1 EXPECTED VALUE TABLE

| ROUTE \ WAVE-LENGTH | 1 | 2 | 3 | 4 |
|---|---|---|---|---|
| (1) | 0 | 0 | 0 | 0 |
| (2) | 0 | 0 | 0 | 0 |
| ⋮ | ⋮ | ⋮ | ⋮ | ⋮ |
| (12) | 0.50 | 0.50 | 0.50 | 0.50 |

FIG. 24

ROUTE ALLOCATION APPARATUS AND METHOD

CROSS-REFERENCE TO RELATED APPLICATION

This application is based upon and claims the benefit of priority of the prior Japanese Patent Application No. 2010-038141, filed on Feb. 24, 2010, the entire contents of which are incorporated herein by reference.

FIELD

The embodiment discussed herein is related to a route allocation apparatus which performs data communication and a route allocation method for performing a route allocation.

BACKGROUND

An information volume flowing through a network has been exponentially increasing with an expansion of a multimedia service using the Internet, and traffic flowing through an information communication network has been largely increasing.

When the traffic has been increasing, the number of packets arriving at the same time increases, for example, within a router constructing a network. As a result, the number of times of buffering of packets increases, or load on the control of a route calculation based on a routing table increases.

For this purpose, a memory device with large power consumption, such as a high-capacity memory used for a packet buffer and a high-speed memory used for a route calculation has been disposed within the routers.

In recent years, the construction of a power-saving network is desired by a lot of users. As described above, power consumption of routers particularly has a large influence on that of the entire network, and therefore, the key to the power-saving network is offered by how the power consumption of routers is reduced.

As a conventional technique, there is proposed a technique in which a central processing unit prepares a routing table by calculating a distributing ratio of all routes on a route list and periodically updates the routing table (Japanese Laid-open Patent Publication No. 11-239181). Further, there is proposed a technique in which a communication equipment is configured by a band calculating means which calculates a transmission band from bands allocated to its own station and a destination and that allocated to all the nodes other than the destination, and a transmitting means which transmits information in the range of the transmission band (Japanese Laid-open Patent Publication No. 2002-247092).

There is considered a communication system in which when constructing a power-saving network, a slot (time slot) of a packet to be transmitted is previously allocated to transfer packets on a time-sharing base by a server side component which manages a network.

The above-described communication system is a system in which a server performs scheduling of the packet transferring such that at which time from which transmission source to which destination the packet is transferred, and then performs the packet transmission.

For example, performing the above-described control makes it possible to reduce a frequency of occurrence of a state in which a plurality of packets reach a router at the same time, and further reduce the number of times of buffering. As a result, this processing makes it possible to eliminate from the router a large-power consumption and high-capacity memory used for a packet buffer.

For example, since the router itself can be used without performing a conventional route calculation, a load necessary for the route calculation can be reduced, and a large-power consumption and high-speed memory used during the route calculation need not be used. The power consumption of routers is taken notice of and described above. The power consumption of switches constituting the network can be reduced based on the same reason.

On the other hand, it is considered that when performing scheduling, there is previously calculated an index of how many routes can be allocated to slots more so as to correspond with increase in the route accompanying a traffic variation of the network. Also, it is considered that the scheduling such that the route is allocated to slots based on the index is performed. This processing makes it possible to flexibly respond to it, even when an additional request of the route allocation is performed during the operation.

Further, after performing the allocation of the route during the operation, an index of how many routes can be allocated to slots more in the present state in which the route is allocated to slots is desired to be anew calculated to be optimized for being prepared for the next route allocation request.

However, the calculation amount for obtaining the above-described index from an arbitrary combination of routes and slots is large. Further, as a network configuration becomes more complicated, the calculation amount becomes larger. In this case, there arise the following problems. If the scheduling with a large calculation amount is performed both before the operation and in response to every additional request of a route made during the operation, in order to optimize the route allocation, real-time responses are prevented from being made and communication efficiency is reduced.

SUMMARY

According to one aspect of the present invention, there is provided a computer-readable, non-transitory medium storing a route allocation program which causes a computer to perform a procedure comprising: obtaining a route between an outgoing edge node and an incoming edge node within a network; and allocating the route to a communication slot, wherein: in the allocating, an expected value is calculated as an index of the number of the routes allocatable to the communication slot, and a route allocation in which the expected value is a maximum is selected; and after the allocating, the number of the routes allocatable to the selected communication slot is calculated, and the expected value is updated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates a route allocation number table;

FIG. 8 illustrates the route allocation number table;

FIG. 9 illustrates an expected value table;

FIG. 10 illustrates the route allocation number table after update;

FIG. 11 illustrates the route allocation number table after the update;

FIG. 12 illustrates the expected value table after the update;

FIG. 19 illustrates the route allocation number table;

FIG. 20 illustrates the route allocation number table;

FIG. 21 illustrates the expected value table;

FIG. 22 illustrates the route allocation number table after the update;

FIG. 23 illustrates the route allocation number table after the update;

FIG. 24 illustrates the expected value table after the update;

DESCRIPTION OF EMBODIMENTS

Figure 1:
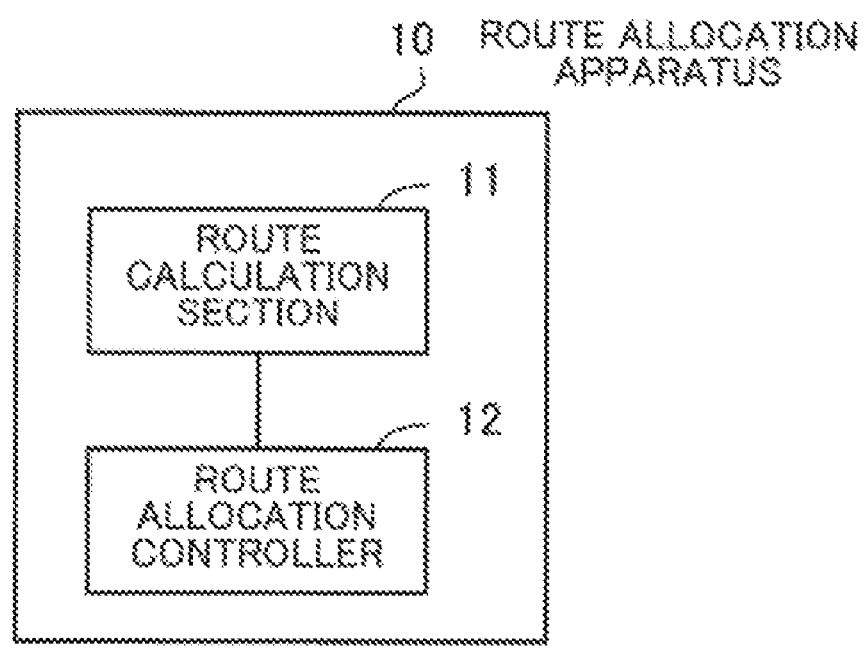
FIG. 1 illustrates a configuration example of a route allocation apparatus.

Preferred embodiments of the present invention will now be described in detail below with reference to the accompanying drawings, wherein like reference numerals refer to like elements throughout. FIG. 1 illustrates a configuration example of a route allocation apparatus. The illustrated route allocation apparatus 10 includes a route calculation section 11 and a route allocation controller 12. The route allocation apparatus 10 is installed, for example, at a management server of a network.

The route calculation section 11 calculates a route between an outgoing edge node and incoming edge node within the network. The route allocation controller 12 allocates the route to communication slots before a network operation.

In this case, the route allocation controller allocates the routes to a plurality of communication slots also at the time of operating a network so as to correspond with a route variation and prevent data from colliding with each other.

Here, when allocating the routes to the plurality of communication slots, the route allocation controller 12 calculates an expected value as an index of the number of the routes allocatable to the communication slots and selects a route allocation in which the expected value is maximized.

Further, the route allocation controller 12 updates the expected value for being prepared for the next route change after the route allocation. In this case, the route allocation controller 12 does not calculate the number of the routes allocatable to all the communication slots to calculate the expected value, but performs a calculation processing while recognizing a part in which a difference occurs. Further, the route allocation controller 12 freshly calculates the number of the allocatable routes after the route allocation change to one communication slot selected during the route allocation, and updates the next expected value (description will be made in detail below with reference to concrete examples).

Also in a phase during the operation, this processing makes it to immediately provide the route allocation based on a calculation result of an expected value base during the route change and perform an optimal allocation of the expected value base in real time. In a subsequent description, the communication slot is simply referred to as a slot.

Next, terms of the "slot", the "route", the "path", and the "expected value" will be described. The term "slot" is a fixed-length time interval for transmitting a packet, and occupies a fixed range of the time interval in a frame. One slot with a certain specific number is present in the frame, and since the frame is periodically repeated, the slot with the specific number is also repeated in the same period.

The term "route" is defined as a combination of an outgoing edge node and an incoming edge node (a relay node which is positioned between the outgoing edge node and the incoming edge node is not normally considered). Further, a band demand as a desired band is given to the route. In addition, the route includes paths more than or equal to one path (allocated in conjunction with the band).

The term "path" is defined as a combination of links (a transmission path connecting nodes) from the outgoing edge node up to the incoming edge node within one slot. The band of one path is a minimum unit of the band allocation and equal to (link speed/the number of slots).

The term "expected value (route allocation expected value)" is an index of the number of the routes allocatable to the slots, and is simply an index of how many percentages of all the routes can be allocated to one slot. The expected value takes a value in a range of 0 to 1, and when being equal to 0, the expected value represents that there is no margin for allocating the route more, whereas when being equal to 1, the expected value represents that there is a margin for allocating the route up to a maximum.

A larger expected value is regarded as a state of being preferable to a route change along with the traffic variation (When the expected value is large, the degree of margin for allocating the route is large. Therefore, even if the route increase request is issued, the route can be dynamically allocated to the slots during the operation.). A definitional equation of the expected value will be described below.

Next, the entire operation with regard to the route allocation of the route allocation apparatus 10 will be described. There are calculated all the routes as combinations of all the outgoing edge nodes and incoming edge nodes introduced from a network construction in the phase before the operation.

Further, the number of combinations of the routes allocatable to the slots is calculated (for example, calculated by using the Dijkstra method (Dijkstra method: an all-purpose computational algorithm for solving a shortest route problem)) and the expected value is preliminarily calculated. The above-described calculation is first performed only once.

Further, in the phase during the operation, when the route change request is issued, the route allocation apparatus 10 immediately responds, as the allocation slot, a slot in which the expected value is maximized with respect to the requested route. Further, the route allocation apparatus 10 updates and calculates only a necessary part of the next expected value after the route allocation by the time when the next route change request is issued. This processing permits a necessary calculation amount to be reduced.

Figure 2:
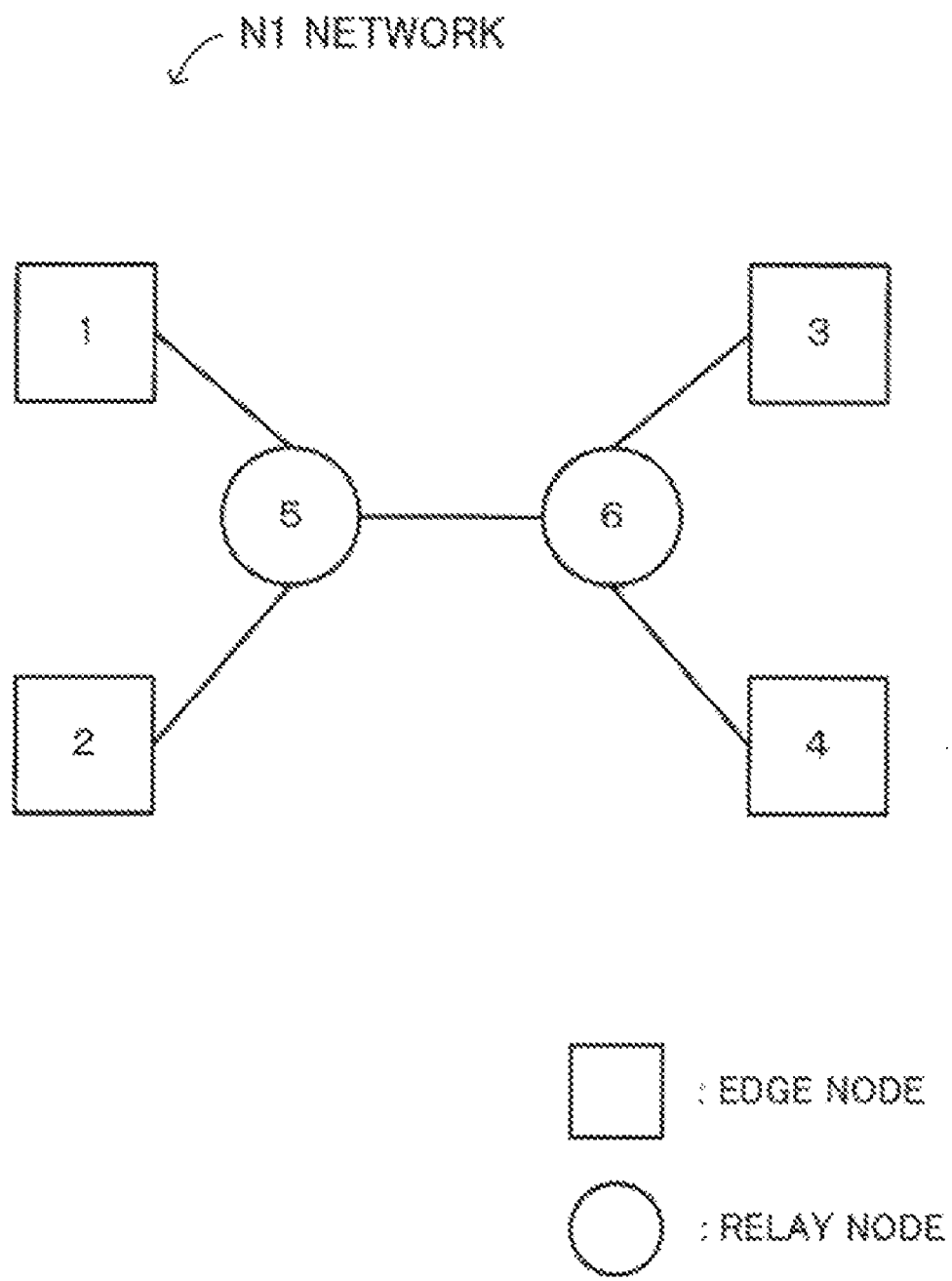
FIG. 2 illustrates a network configuration example.

Next, the allocation of the routes to the slots will be described with reference to FIGS. 2 to 6. FIG. 2 illustrates a configuration example of the network. Subsequently, the edge node is illustrated by a square frame, and the relay node is illustrated by a circular frame.

A network N1 includes edge nodes 1 to 4 and relay nodes 5 and 6. The relay node 5 is connected to the edge node 1, and to the edge node 2. The relay node 6 is connected to the edge node 3, and to the edge node 4. Further, the relay nodes 5 and 6 are connected.

In the network N1, when connecting the edge nodes by a full-mesh topology, the number of the routes is equal to 12 (when halfway relay nodes connecting the edge nodes are also illustrated, the sum is 12. The 12 routes are as follows: 1 to 5 to 2, 1 to 5 to 6 to 3, 1 to 5 to 6 to 4, 2 to 5 to 1, 2 to 5 to 6 to 3, 2 to 5 to 6 to 4, 3 to 6 to 5 to 1, 3 to 6 to 5 to 2, 3 to 6 to 4, 4 to 6 to 5 to 1, 4 to 6 to 5 to 2, and 4 to 6 to 3).

Figure 3:
FIG. 3 illustrates a routing table.

FIG. 3 illustrates the routing table. FIG. 3 illustrates a routing table T0 in which a number is allocated to the route between a start-point edge node and an end-point edge node (the routing table T0 is managed by the route calculation section 11).

When a certain slot (defined as a slot s1) is assumed to be not yet used, any one of the routes in the routing table T0 can be allocated to the slot s1. That is, "the number of the routes allocatable to the slot s1" is equal to 12.

Figure 4:
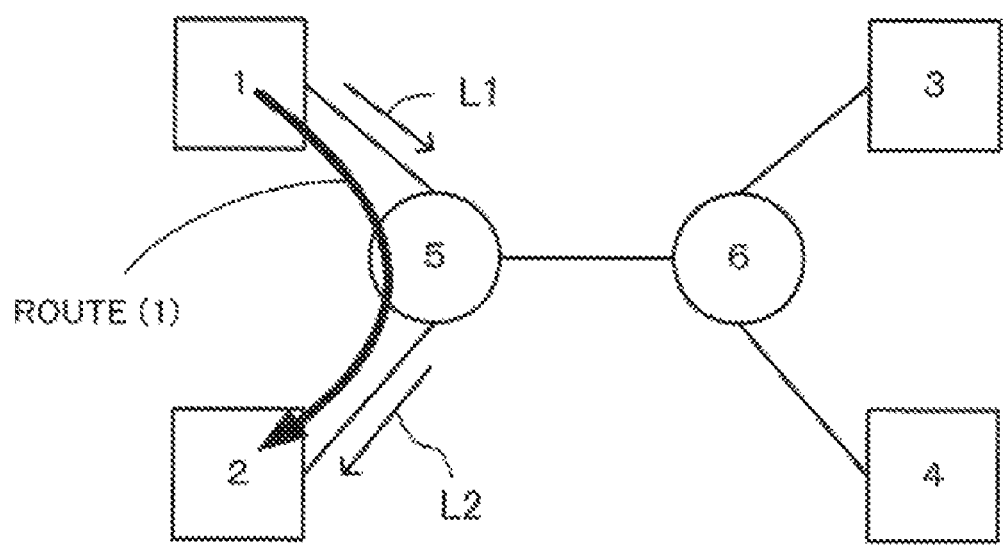
FIG. 4 illustrates a route used by a slot.

FIG. 4 illustrates the route used by the slots. The route (1) of 1 to 5 to 2 with a thick arrow illustrated in FIG. 4 is assumed to be allocated to the slot s1 at present. It is considered that how many routes can be selected from among the routes (2) to (12) and more allocated to the above-described state.

Here, "a route can be allocated to slots" and "a route cannot be allocated to slots" will be described. With respect to one route already allocated to slots, when another route does not share a link with the same data transferring direction as that of a link of the one route, both data blocks are prevented from colliding with each other, and therefore the another route can be allocated to its slots.

On the other hand, with respect to one route already allocated to slots, when another route shares a link with the same data transferring direction as that of a link of the one route, the data collision occurs, and therefore the another route cannot be allocated to its slots.

As illustrated in FIG. 4, a link in the data transferring direction from the edge node 1 to the relay node 5 is defined as a link L1, and on the other hand, a link in the data transferring direction from the relay node 5 to the edge node 2 is defined as a link L2.

For example, when viewing the route (2) of 1 to 5 to 6 to 3, the route (2) shares the link L1 with the route (1). Therefore, the route (2) cannot be allocated to the slot s1 to which the route (1) is already allocated.

On the other hand, when viewing the route (9) of 3 to 6 to 4, the route (9) does not share the links L1 and L2 with the route (1), and therefore the route (9) can be allocated to the slot s1. In addition, when viewing the route (4) of 2 to 5 to 1, data is transferred in a direction opposite to the data transferring direction of the links L1 and L2. Therefore, the route (4) does not share the links L1 ad L2 with the route (1), and as a result, the route (4) can be allocated to the slot s1.

Based on the above-described idea, when finding an allocatable route to the slot s1 to which the route (1) is already allocated, seven routes, namely, the routes (4), (5), (6), (7), (9), (10), and (12) can be allocated to the slot s1 in the case of this example.

Accordingly, with respect to the slot s1 to which the route (1) is already allocated, "the number of the routes allocatable to the slot s1" is equal to 7.

FIGS. 5A, 5B, 6A and 6B illustrate routes used by slots. Suppose that there are four (=N) slots (slots s1 to s4) in total, and routes are currently allocated to the respective slots s1 to s4 under use conditions as illustrated in FIGS. 5A, 5B, 6A and 6B.

Figure 5A:
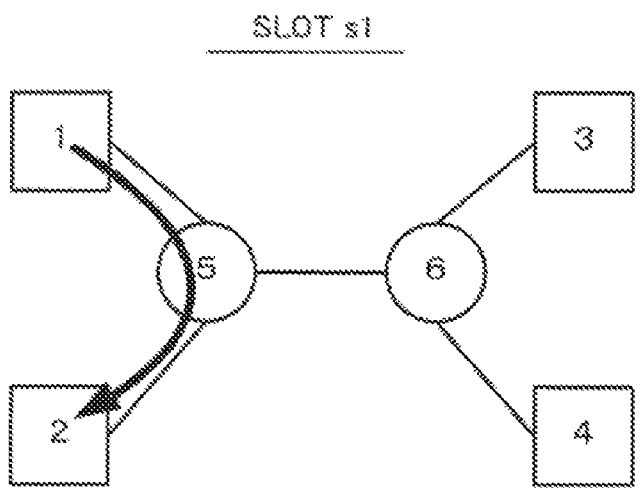
FIGS. 5A and 5B illustrate the route used by the slot.
Figure 5B:
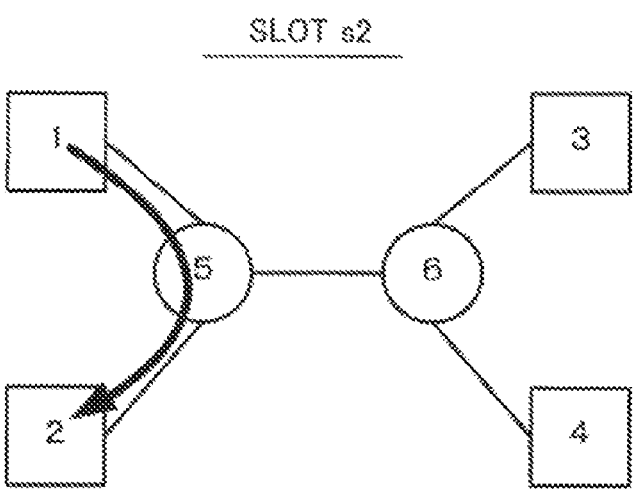
Figure 6A:
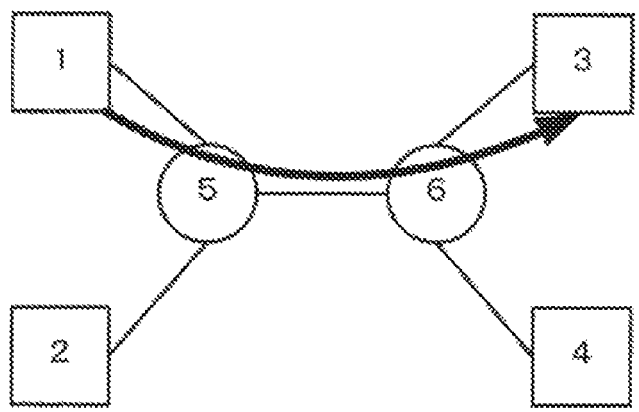
FIGS. 6A and 6B illustrate the route used by the slot.
Figure 6B:
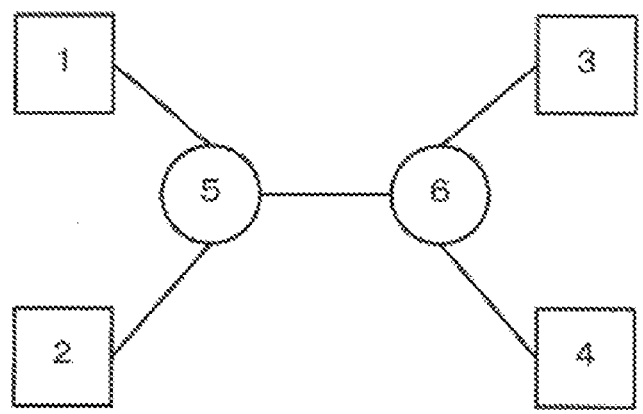

Specifically, suppose that the route (1) is allocated to the slots s1 and s2 in FIGS. 5A and 5B, the route (2) is allocated to the slot s3 in FIG. 6A, and no route is allocated to the slot s4 in FIG. 6B.

In this case, the number of the routes allocatable to the slots s1 to s4 is obtained based on the above-described idea. That is, the number of the routes more allocatable to the slot s1 is equal to 7, and the number of the routes more allocatable to the slot s2 is also equal to 7. Further, the number of the routes more allocatable to the slot s3 is equal to 6, and the number of the routes more allocatable to the slot s4 is equal to 12.

On the other hand, when calculating the number of the slots, a minimum band demand of all the routes is divided by its greatest common divisor (band of one slot). Further, the number of the paths necessary for each route is obtained, and at the same time, the number of the slots is determined by using (link speed/band of one slot).

Next, a prior calculation of the expected value to the slots s1 to s4 will be described (the term "prior" means the phase before the operation). When calculating the expected value, the route allocation controller 12 first prepares and manages a table in which values of parameters (aj and bi,j) are each used as a constituent factor. Note that j denotes a slot number, and denotes a route number.

FIG. 7 illustrates a table for the number of the allocatable routes (hereinafter, simply referred to as a route allocation number table). The illustrated route allocation number table T1a is a table including the values of the parameter aj, and the parameter aj represents the number of the routes allocatable to the slot j in the present allocation state. As described above, the number of the routes allocatable to the slots s1 to s4 is 7, 7, 6, and 12, respectively, and therefore, a1=7, a2=7, a3=6, and a4=12 are obtained.

FIG. 8 illustrates a route allocation number table. The illustrated route allocation number table T1b is a table including the values of the parameter bi,j. The parameter bi,j represents the number of the subsequent allocatable routes in the case of allocating an arbitrary route i to a slot j in the present route allocation state.

For example, "7" indicated by a value b1,4 of the table T1b is a value of how many routes can be more allocated to the slot s4 in a state where the route (1) is currently allocated to the slot s4, and represents that seven routes can be allocated to the slot s4.

Further, indicated by values of the parameter bi,j of the table T1b represents that the route cannot be allocated to the slot j. For example, when a value b1,3 indicates 0, "0" represents that the route (1) cannot be allocated to the slot s3 (the reason is that the route (2) shares a link with the same data transferring direction with the route (1)).

As described above, values aj and bi,j are preliminarily obtained in all the routes by using an algorithm such as the Dijkstra method, respectively, to prepare the route allocation number tables T1a and T1b.

Thereafter, the expected value ei,j at the time of allocating the route i to the slot j is preliminarily calculated in the present route allocation state by using the route allocation number tables T1a and T1b. The expected value ei,j herein represents the subsequent expected value of the entire system in the case of allocating the route i to the slot j in the present allocation state.

Here, assuming that N is the number of the slots used for the route allocation and L is the number of the routes, the expected value ei,j is calculated by an equation (1).

[Equation (1)]

$$e_{i,j} = \left( \sum_{k=1, k \neq j}^{N} a_k + b_{i,j} \right) / (L \times N) \quad (1)$$

FIG. 9 illustrates an expected value table. The illustrated expected value table T2 illustrates results of the expected value ei,j calculated by using the equation (1) based on the values of the parameters aj and bi,j of the respective route allocation number tables T1a and T1b illustrated in FIGS. 7 and 8.

Subsequently, as a calculation example of the expected value, the description will be made of the case where the expected value e1,4 is calculated such that when the route (1) is allocated to the slot s4, how many routes can be more allocated.

Since obtaining a1=7, a2=7, and a3=6 from the route allocation number table T1a, and b1,4=7 from the route allocation number table T1b, the expected value e1,4 is calculated as follows based on the equation (1).

$$e1,4 = (a1+a2+a3+b1,4)/(L \times N) = (7+7+6+7)/(12 \times 4) = 0.56 \quad (1a)$$

If the route (1) is allocated to the present route allocation state of the entire system, the expected value e1,4 after allocating the route (1) to the slot s4 is equal to 0.56.

Viewing other expected values, for example, the expected value e12,1 is equal to 0.60 and the expected value e12,4 is equal to 0.54.

More specifically, with regard to the expected value e12,1, when the route (12) is allocated to the slot s1 during a request of the route (12), the next expected value of the entire system is equal to 0.60. Further, with regard to the expected value e12,4, when the route (12) is allocated to the slot s4 during a request of the route (12), the next expected value of the entire system is equal to 0.54.

Each ei,j is obtained by performing the above-described calculation to prepare the expected value table T2. In the case of calculating the expected value by using the equation (1), when a certain route is assumed to be allocated to a certain slot in the present route allocation state, an index of how many routes can be allocated to slots can be efficiently calculated.

In the expected value table T2, the slot with a largest value in each row is a slot allocated at the time of requesting a route (the reason is that the route allocation controller 12 can dynamically allocate more routes to slots with larger expected values), and therefore, the above-described slot is stored and maintained as an allocation slot.

Values within a black thick frame column of FIG. 9 are those ought to be stored as the allocation slot. For example, when the route (1) is requested, the route (1) is allocated to the slot s4 as a slot number j=4.

A calculation amount of each parameter will be described on the above-described prior calculation of the expected value performed before the operation. As to the values of the parameters aj and bi,j, the Dijkstra calculation need be fully performed with respect to all the routes for calculating separate value, and therefore, the calculation amount is large. As compared with the above-described calculation, the expected value ei,j can be calculated in the range of four simple arithmetic operations, and therefore, the calculation amount is small.

Next, operations at the time when the route change request is issued during the operation will be described. When the route change request is received, a slot which has been extracted by using the prior calculation of the expected value and whose expected value is largest is determined as a route allocation destination and immediately responded.

Thereafter, the values aj and bi,j after the route allocation determination are corrected and the expected value is calculated and updated anew for being prepared for the next change request. In the case of performing the above-described update processing, when a procedure performed by the prior calculation of the expected value is repeated from the start again, the calculation amount becomes large. Therefore, only a changed part is extracted and calculated to reduce the calculation amount.

The update processing of the expected value will be described in the following [1] to [3]. Note that a number of the allocated route is defined as I, and a number of the allocated slot is defined as J.

[1] Values of a parameter aJ are replaced by those of a parameter bI,J, and the route allocation number table T1a is rewritten.

[2] Values of a parameter bi,J (1≤i≤L) after the route allocation are calculated (for example, the recalculation is performed by using the Dijkstra method; however, since the values of only the parameter bi,J (1≤i≤L) are calculated, the calculation amount is small), and the route allocation number table T1b is rewritten. At this time, the recalculation on the values of the other parameter bi,j is not performed.

[3] Based on the values of the parameters aj and bi,j calculated by the items [1] and [2], the expected values ei,j are recalculated.

Here, as one example, the update processing after allocating the route (1) to the slot s4 will be described. As an update procedure, the values of the parameter aJ are first replaced by those of the parameter bI,J.

FIG. 10 illustrates the route allocation number table after the update processing. The illustrated route allocation number table T1a-1 illustrates a table state including the values of the parameter aj after the update processing.

Since the route (1) is allocated to the slot s4, I=1 and J=4 are obtained. Accordingly, the value a4 (=12) of the route allocation number table T1a illustrated in FIG. 7 is replaced by the value b1,4 (=7) of the route allocation number table T1b illustrated in FIG. 8. Therefore, the value a4 of the route allocation number table T1a-1 is updated to 7 (a thick frame of the table illustrates an updated part).

As the next update procedure, when the routes (1) to (12) are allocated to the present allocation state of the slot s4, how many routes can be more allocated to slots is recalculated and the route allocation number table T1b is rewritten. At this time, the recalculation regarding the slots s1 to s3 is not performed.

FIG. 11 illustrates the route allocation number table after the update processing. The route allocation number table T1b-1 illustrates a table state including the values of the parameter bi,j after the update processing.

Values of the parameter bi,4 (1≤i≤L) as the number of the routes allocatable to the slot s4 after the route allocation are calculated. Specifically, the values of b1,4, b2,4, b3,4, b4,4, b5,4, b6,4, b7,4, b8,4, b9,4, b10,4, b11,4, and b12,4 are calculated, respectively. For example, suppose that values as illustrated within a thick frame are obtained.

For example, a value b12,4=4 of the route allocation number table T1b-1 represents that when the route (12) is further allocated to the slot s4 in a state where the route (1) is allocated to the slot s4, how many routes can be allocated more, namely, four routes can be allocated more (a value 0 of the table represents that a route cannot be allocated any more).

Next, as an update procedure, the expected value ei,j is calculated by using the equation (1) based on the values of the parameters aj and bi,j of the respective route allocation number tables T1a-1 and T1b-1.

FIG. 12 illustrates the expected value table after the update processing. The expected value table T2-1 is prepared by calculating the expected values during the update processing. It is considered that as a calculation of the expected value, for example, when the route (12) is allocated to the slot s4, the expected value e12,4 indicating how many routes can be more allocated to slots is calculated.

Based on the route allocation number table T1a-1, a1=7, a2=7, and a3=6 are obtained, and based on the route allocation number table T1b-1, b12,4=4 is obtained. Therefore, the expected value e12,4 is calculated as follows based on the equation (1).

$$e12,4=(a1+a2+a3+b12,4)/(L \times N)=(7+7+6+4)/(12 \times 4)$$
$$=0.5 \quad (1b)$$

In the same manner, the other, expected values are also calculated to prepare the expected value table T2-1. Then, when the next route request is issued, the slot with the largest expected value is determined as the route allocation destination and immediately responded based on the expected values managed by the expected value table T2-1. Thereafter, the values of the parameters aj and bi,j after the route allocation determination are corrected and the expected values are calculated and updated anew being prepared for the next change request. Subsequently, the above-described repetition is performed. When the above-described update processing of the expected value is performed, the expected value which is prepared for the next route change request can be introduced in a short period of time.

In the above-described control, the calculation of the expected value in a direction of increasing the routes is described. Further, also in a direction of decreasing the routes, the values of the above-described parameters aj and bi,j and expected value ei,j are prepared, and the same prediction calculation as that of the expected value can be used.

Figure 13:
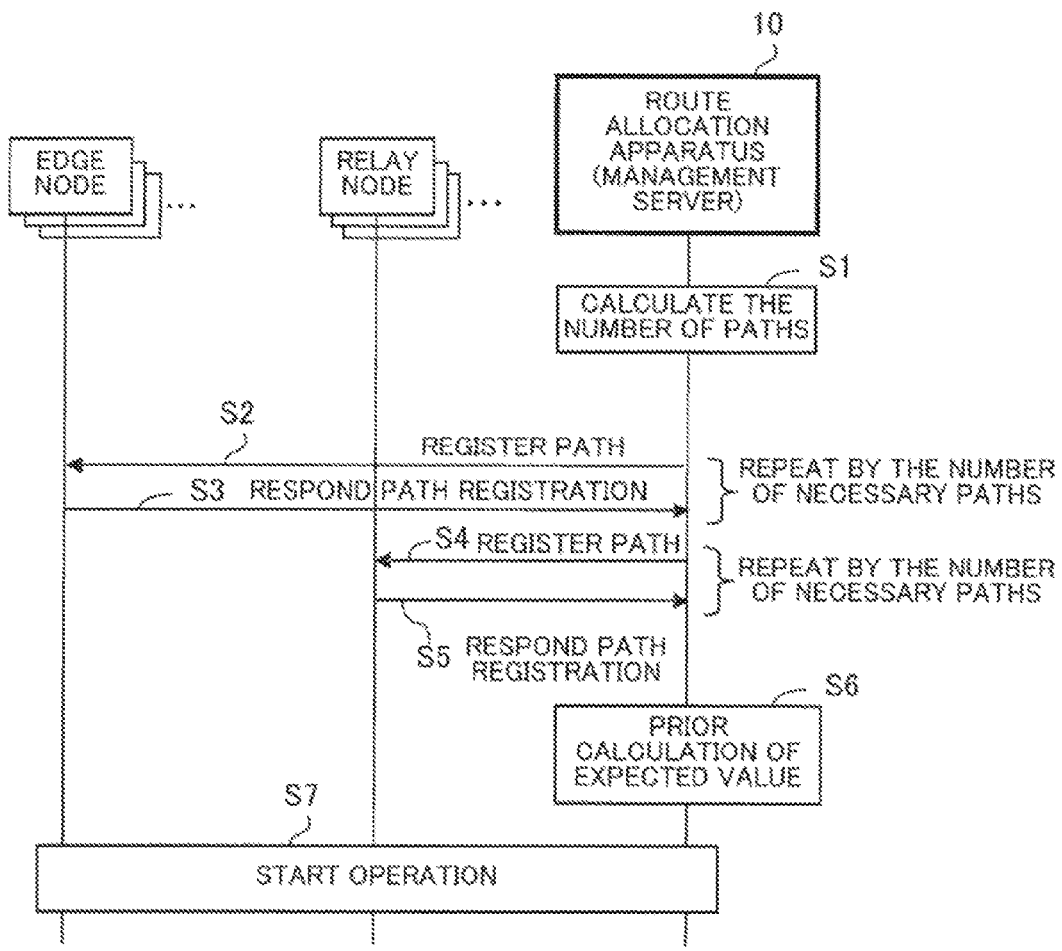
FIG. 13 illustrates an operation sequence before an operation.

FIG. 13 illustrates an operation sequence before the operation.

[S1] The route calculation section 11 of the route allocation apparatus 10 calculates the number of paths included in a predetermined route.

[S2] The route calculation section 11 registers the paths included in the predetermined route to the edge nodes.

[S3] The edge node performs a path registration to its own node and sends back a response.

Note that a repetition is performed by the number of necessary paths in the path registration of step S2 and the path registration response of step S3.

[S4] The route calculation section 11 registers paths included in the predetermined route to the relay node.

[S5] The relay node performs the path registration to its own node and sends back the response. Note that a repetition is performed by the number of necessary paths in the path registration of step S4 and the path registration response of step S5.

[S6] The route allocation controller 12 performs the prior calculation of the expected value.

[S7] The operation of the system is started.

Figure 14:
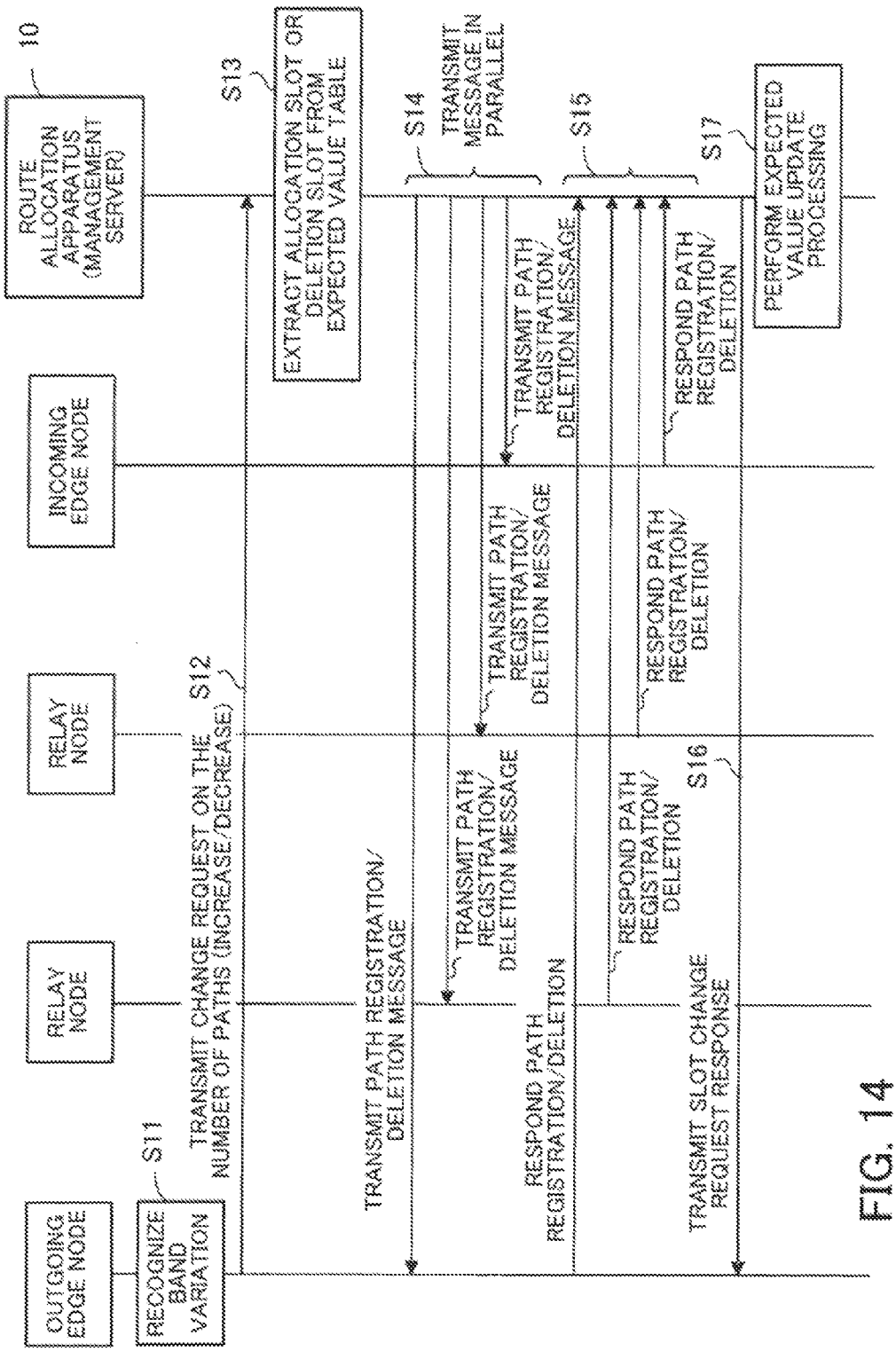
FIG. 14 illustrates the operation sequence during operation.

FIG. 14 illustrates an operation sequence during the operation.

[S11] The outgoing (transmission source) edge node recognizes a band variation of the route.

[S12] The outgoing edge node transmits to the route allocation apparatus 10 a change request of the number of paths regarding the increase or decrease in the number of paths within the route.

[S13] The route allocation controller 12 of the route allocation apparatus 10 allocates increased paths to a slot with the largest expected value during the path increase request based on the present expected value table. The route allocation controller 12 deletes decreased paths from a slot with the largest expected value during the path decrease request.

[S14] The route calculation section 11 transmits a message on the path registration or path deletion to the outgoing edge node, the relay node, and the incoming (destination) edge node.

[S15] The outgoing edge node, the relay node, and the incoming edge node each perform the path registration or path deletion to its own node and send back a response.

[S16] The route allocation controller 12 transmits to the outgoing edge node a slot change request response indicating a slot change as to which slot the route is allocated to.

[S17] The route allocation controller 12 performs calculation by a part regarding a difference of a changed part and performs an expected value update processing for being prepared for the next route change request.

As described above, the route allocation apparatus 10 can use the route allocation of the expected value base and optimize the use efficiency of the slots (can allocate more routes to slots) also in the phase during the operation. Further, the route allocation apparatus 10 updates the expected value calculation during the operation by reducing a calculation amount, and therefore, can perform the route allocation at high speed also during the operation, perform a response in real time, and attain an improvement in the communication efficiency.

Next, a modification example will be described. The route allocation apparatus 10 which provides a plurality of slots on the time axis according to TDM (Time Division Multiplexing) and performs a dynamic allocation at high speed is described. Further, the route allocation apparatus can allocate a route not to a slot of a time interval but to a wavelength and perform optical communications.

Figure 15:
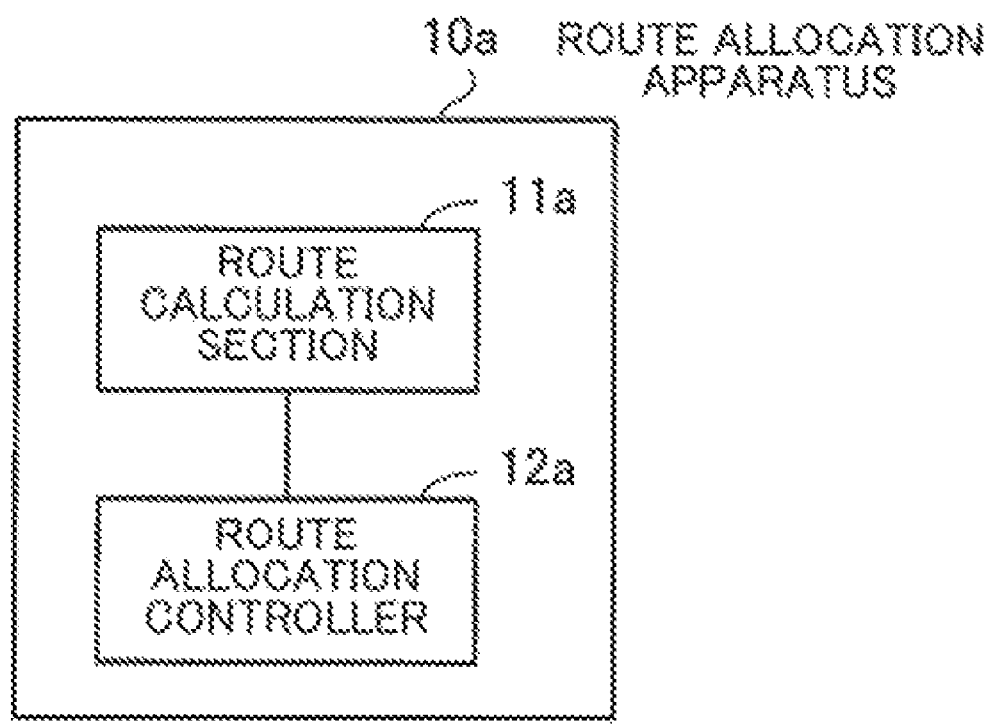
FIG. 15 illustrates a configuration example of the route allocation apparatus.

FIG. 15 illustrates a configuration example of the route allocation apparatus. In the above-described route allocation apparatus 10, the slot is defined on the time axis. On the other hand, in the illustrated route allocation apparatus 10a, the slot defined on the time axis is replaced by a wavelength defined on a wavelength axis. That is, a TDM path on the time axis is replaced by a λ path on the wavelength axis.

The route allocation apparatus 10a includes a route calculation section 11a and a route allocation controller 12a. The route calculation section 11a calculates a route between the outgoing edge node and incoming edge node within an optical network. The route allocation controller 12a allocates a route to a wavelength.

Here, the route allocation controller 12a calculates the expected value as an index of the number of routes allocatable to a wavelength, and selects a route allocation in which the expected value is maximized. Further, the route allocation controller 12a calculates the number of the routes allocatable to one selected wavelength, and updates the next expected value after the route allocation.

Figure 16:
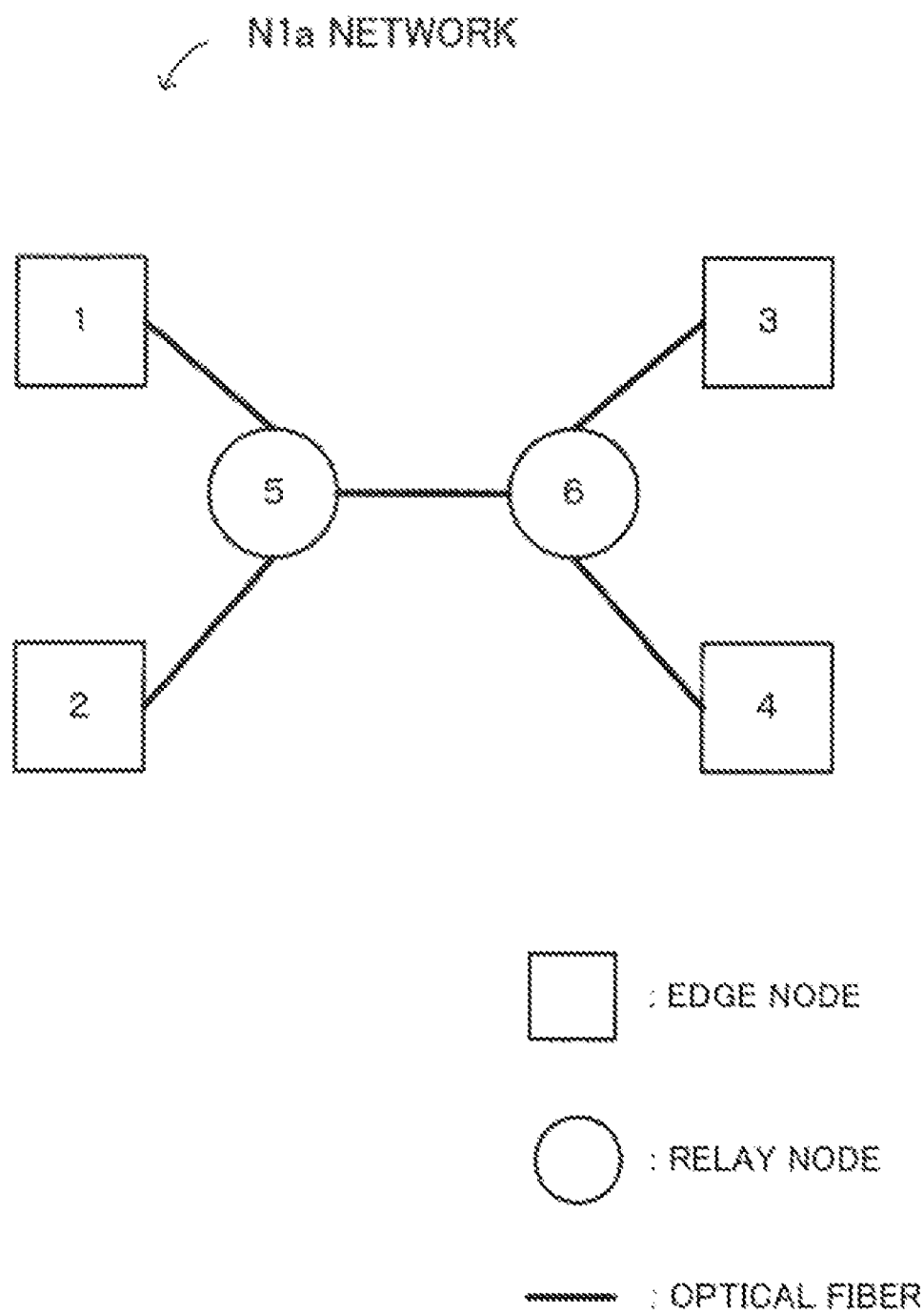
FIG. 16 illustrates the network configuration example.

Next, the allocation of the route to a wavelength will be described with reference to FIGS. 16 to 18. FIG. 16 illustrates a network configuration example. The network N1a includes edge nodes 1 to 4 and relay nodes 5 and 6. Its basic topology is the same as that of the network N1 of FIG. 2, and a link between the nodes is connected via an optical fiber. Note that the routing table of the network N1a is the same as that of the network N1 of FIG. 3.

Figure 17A:
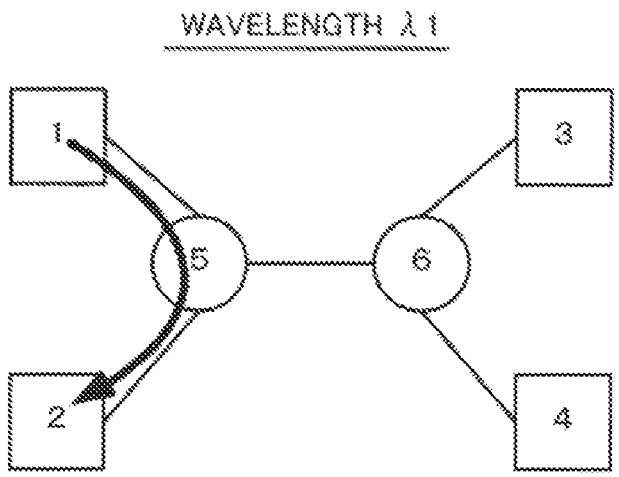
FIG. 17 illustrates a route used by a wavelength.
Figure 17B:
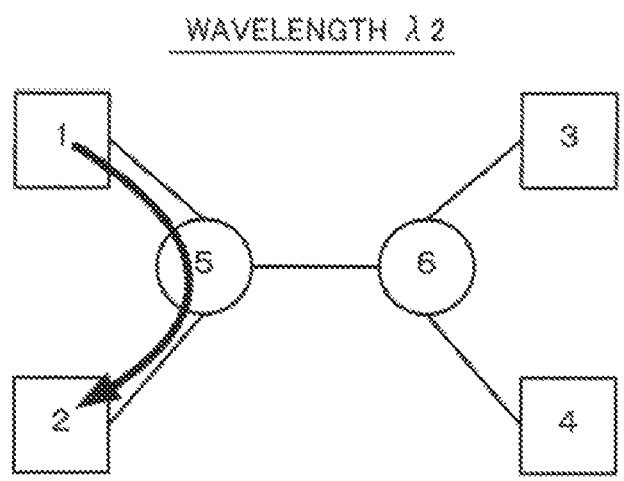
Figure 18A:
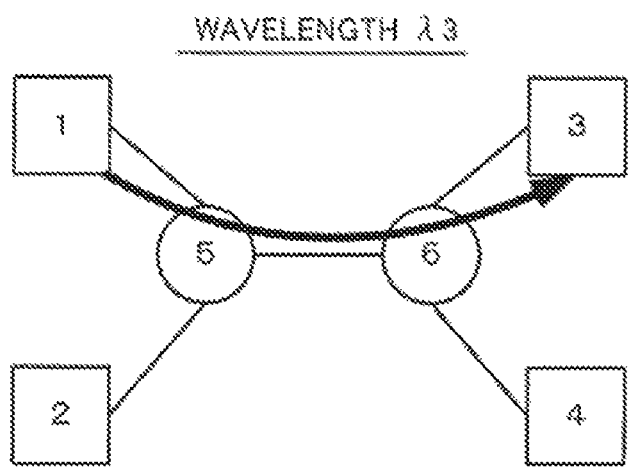
FIG. 18 illustrates the route used by the wavelength.
Figure 18B:
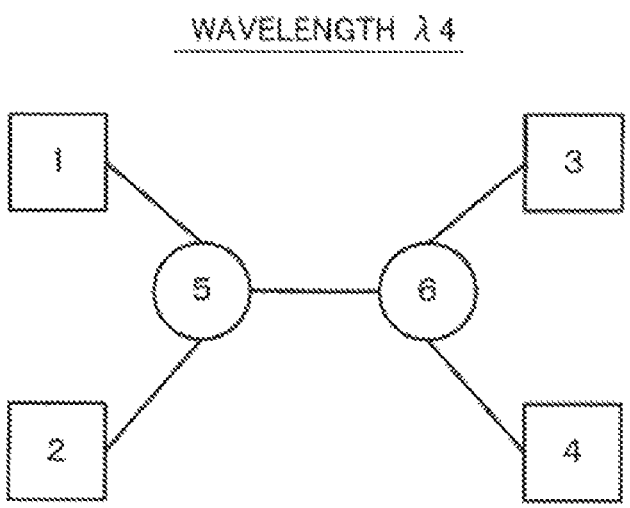

FIGS. 17 and 18 each illustrate a route used by a wavelength. Four (=W) different wavelengths are assumed to be used in total (wavelengths: λ1 to λ4), and routes are assumed to be currently allocated to each of the wavelengths λ1 to λ4 in use conditions as illustrated in FIGS. 17 and 18.

Suppose that specifically, the route (1) is allocated to the wavelengths λ1 and λ2 in FIG. 17, the route (2) is allocated to the wavelengths λ3, and no route is allocated to the wavelength λ4 in FIG. 18.

In this case, the number of the routes more allocatable to the wavelength λ1 is equal to 7, and the number of the routes more allocatable to the wavelength λ2 is equal to 7. Further, the number of the routes more allocatable to the wavelength λ3 is equal to 6, and the number of the routes more allocatable to the wavelength λ4 is equal to 12.

Next, the prior calculation of the expected values to the wavelengths λ1 to λ4 will be described. When calculating the expected values, the route allocation controller 12a first prepares and manages a table in which the values of the parameters (aj and bi,j) are each used as a constituent factor. Note that j denotes a wavelength number, and i denotes a route number.

FIG. 19 illustrates a route allocation number table. The illustrated route allocation number table T11a is a table including the values of the parameter aj, and the parameter aj represents the number of the routes allocatable to a wavelength j in the present allocation state. Since the number of the routes allocatable to the wavelengths λ1 to λ4 is equal to 7, 7, 6, and 12, respectively, a1=7, a2=7, a3=6, and a3=12 are obtained.

FIG. 20 illustrates the route allocation number table. The illustrated route allocation number table T11b is a table including the values of the parameter bi,j, and in the case where an arbitrary route i is allocated to a wavelength j in the present route allocation state, the parameter bi,j indicates the number of the allocatable routes thereafter.

The expected value ei,j at the time of allocating the route i to the wavelength j is calculated with respect to the present route allocation state by using the route allocation number tables T11a and T11b. The expected value ei,j represents the expected value of the entire system thereafter in the case where the route i is allocated to the wavelength j in the present allocation state.

Here, supposing that W is defined as the number of wavelengths used for the route allocation, and L is defined as the number of routes, the expected value ei,j is calculated by using the equation (2).

[Equation 2]

$$ei, j = \left( \sum_{k=1, k \neq j}^{N} ak + bi, j \right) / (L \times W) \quad (2)$$

FIG. 21 illustrates the expected value table. The illustrated expected value table T22 represents the expected value ei,j calculated by using the equation 2 based on the values of the parameters aj and bi,j of the respective route allocation number tables T11a and T11b illustrated in FIGS. 19 and 20. A calculation example of the expected value is the same as that of the above-described route allocation apparatus 10, and therefore, the description will be omitted.

When the expected value is calculated by using the equation 2, in the case where a certain route is allocated to a certain wavelength in the present route allocation state, an index of how many routes can be subsequently allocated to wavelengths can be efficiently calculated.

In the expected value table T22, a wavelength with a largest value in each row is an allocation wavelength at the time when a route request is issued (the reason is that the route allocation controller 12a can dynamically allocate more routes to wavelengths with larger expected values), this wavelength is stored and maintained as the allocation wavelength. A black thick frame column of FIG. 21 indicates a value to be stored as the allocation wavelength.

Next, operations in the case where the route change request is issued during the operation will be described. When the route change request is received, a wavelength which has been extracted by using the prior calculation of the expected value and whose expected value is largest is determined as a route allocation destination and immediately responded.

Thereafter, the values of the parameters aj and bi,j after the route allocation determination are corrected, and the expected value is calculated and updated anew for being prepared for the next change request. In the case of performing this update processing, when a procedure of the prior calculation of the expected value is repeated from the start again, a calculation amount becomes large. Therefore, only a changed part is calculated to thereby reduce the calculation amount. The update processing of the expected value is the same as that of the above-described [1] to [3]. Here, a reference numeral of the allocated wavelength is defined as J.

Here, the update processing after allocating the route (1) to the wavelength λ4 will be described. As the update procedure, the values of the parameter aJ are first replaced by the values of the parameter bI,J.

FIG. 22 illustrates the route allocation number table after the update processing. The route allocation number table T11a-1 illustrates a table state including the values of the parameter aj after the update processing.

Since the route (1) is allocated to the wavelength λ4, I=1 and J=4 are obtained. Accordingly, the value a4 (=12) of the route allocation number table T11a illustrated in FIG. 19 is replaced by the value b1,4 (=7) of the route allocation number table T11b illustrated in FIG. 20, and therefore, the value a4 of the route allocation number table T11a-1 is updated to 7.

As the next update procedure, when the routes (1) to (12) are allocated to the present allocation state of the wavelength λ4, how many routes can be more allocated thereto is recalculated to thereby rewrite the route allocation number table T11b. At this time, the recalculation of the wavelengths λ1 to λ3 is not performed.

FIG. 23 illustrates the route allocation number table after the update processing. The route allocation number table T11b-1 illustrates a table state including the values of the parameter bi,j after the update processing. There are calculated the values of the parameter bi,4 (1≦i≦L) as the number of the routes allocatable to the wavelength λ4 after the route allocation. Specifically, suppose that the values of b1,4, b2,4, b3,4, b4,4, b5,4, b6,4, b7,4, b8,4, b9,4, b10,4, b11,4, and b12,4 are calculated, respectively, and, for example, values as illustrated in the thick frame are obtained.

As the next update procedure, the expected value ei,j is calculated by using the equation (2) based on the values of the parameters aj and bi,j of the respective route allocation number tables T11a-1 and T11b-1.

FIG. 24 illustrates the expected value table after the update processing. The expected value table T22-1 is prepared by the calculation of the expected values at the time of the update processing. There is considered a case in which as the calculation of the expected values, for example, when the route (12) is allocated to the wavelength λ4, the expected value e12,4 of how many routes can be more allocated thereto is calculated.

Since a1=7, a2=7, and a3=6 are obtained based on the route allocation number table T11a-1, and on the other hand, b12,4=4 is obtained based on the route allocation number table T11b-1, the expected value e12,4 is calculated as follows by using the equation (2).

$$e12,4=(a1+a2+a3+b12,4)/(L\times W)=(7+7+6+4)/(12\times 4) \\ =0.5 \tag{2a}$$

In the same manner, the other expected values are calculated and the expected value table T22-1 is prepared. Then, when the next route request is issued, a wavelength with a largest expected value is determined as the route allocation destination and immediately responded based on the expected values managed by the expected value table T22-1. Thereafter, the values of the parameters aj and bi,j after the route allocation determination are corrected, and the expected values are calculated and updated anew for being prepared for the next change request. Subsequently, the above-described repetition is performed. When the above-described update processing of the expected values is performed, the expected values which are prepared for the next route change request can be derived over a short period of time.

Figure 25:
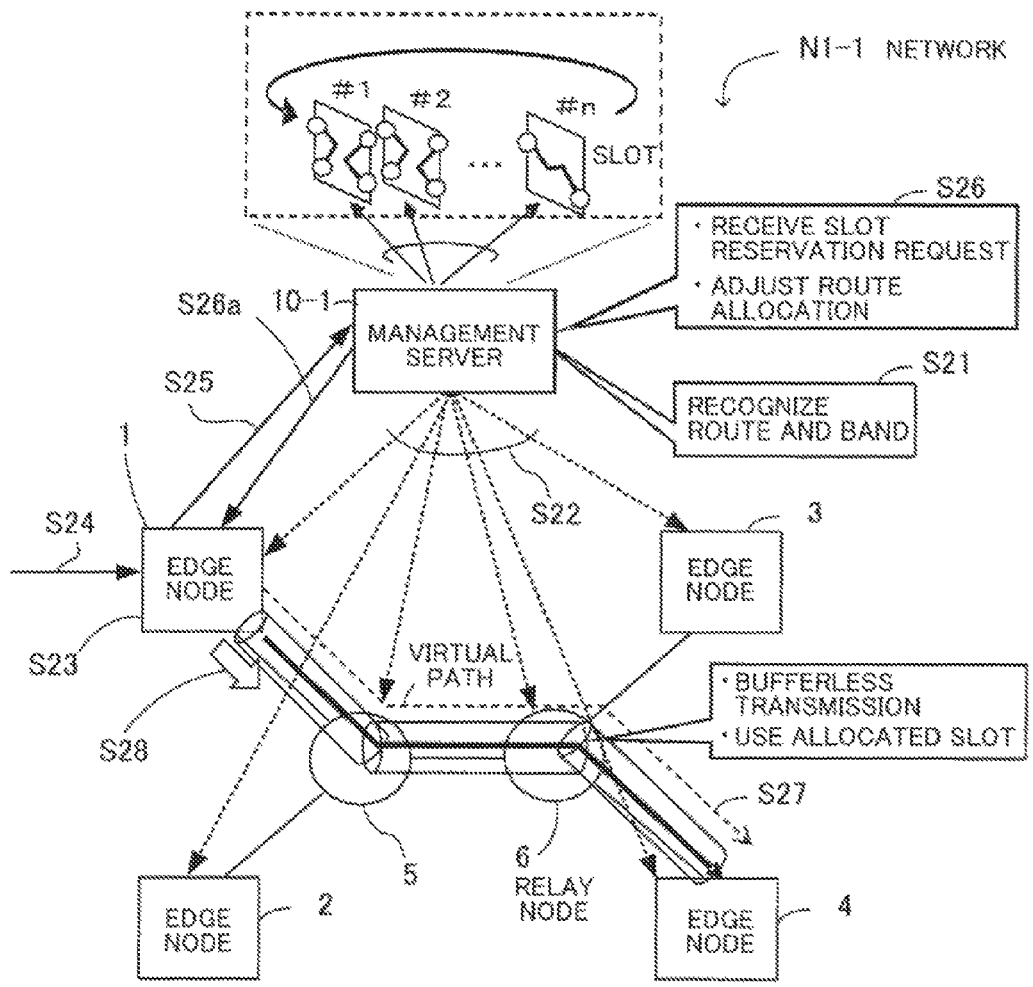
FIG. 25 illustrates a configuration example of a power-saving network.

Next, an outline of a power-saving network having disposed therein a management server including a function of the route allocation apparatus 10 will be described. FIG. 25 illustrates a configuration example of the power-saving network. The network N1-1 has a configuration in which the management server 10-1 is disposed in the network N1 illustrated in FIG. 2.

[S21] The management server 10-1 recognizes a configuration of the network N1-1 and each route (a combination of the outgoing edge node and the incoming edge node), and recognizes as a band demand of the route a minimum band value and maximum band value for each route.

[S22] The management server 10-1 further derives the route allocation to slots and sets it to each node (the edge nodes 1 to 4 and the relay nodes 5 and 6) so as to satisfy the minimum band value.

[S23] The edge nodes 1 to 4 monitor a traffic amount in each route, determine whether a band allocated to its route is appropriate, redundant, or short, recognize whether the number of paths is changed between the minimum band value and the maximum band value, and inform the management server 10-1 of the change in the number of the paths.

[S24] A packet reaches the edge node 1, for example, from the outside. Suppose that the edge node 1 classifies packets for each destination edge node, and determines that a path allocation need be increased.

[S25] The edge node 1 requests a reservation of a slot necessary for a packet transmission to the management server 10-1.

[S26] The management server 10-1 selects, when receiving the slot reservation request, an optimum slot for the route allocation based on the expected value and adjusts the route allocation.

[S26a] The management server 10-1 responds a result of the route allocation to the edge node 1.

[S27] The edge node 1 specifies a change in a slot to the relay nodes 5 and 6.

[S28] The edge node 1 transmits the packet in conjunction with the slot informed by the management server 10-1. In addition, the relay nodes 5 and 6 relay and transmit a packet through a bufferless transmission link in conjunction with a slot ID.

Figure 26:
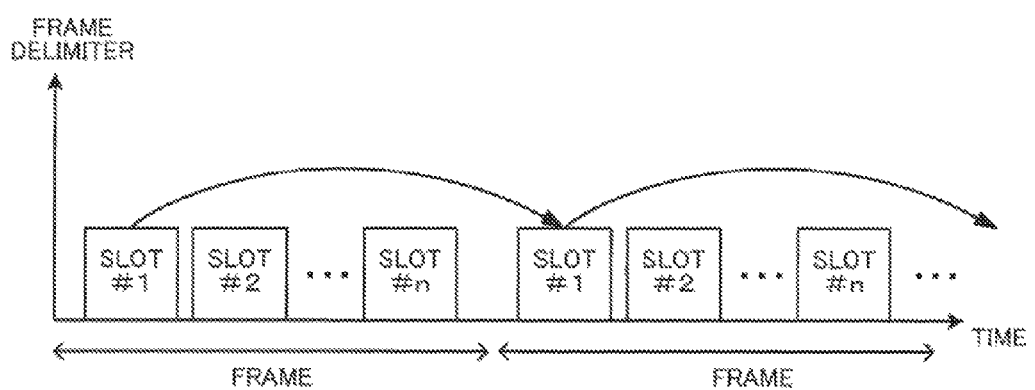
FIG. 26 illustrates a frame in which slots are arranged.

FIG. 26 illustrates a frame on which slots are disposed. The horizontal axis represents the time, and the vertical axis represents the frame delimiter. The frame having disposed thereon the slots #1 to #n is repeatedly transmitted from the edge node. Further, a slot with the same number is continuously transmitted in the same route (path).

As described above, the management server 10-1 including a function of the route allocation apparatus 10 is disposed, slots for a packet to be transmitted are previously allocated, a packet transmission is performed on a time division base, thereby building a power-saving network.

Further, the management server 10-1 can calculate the expected value for allocating a route to slots, perform the update processing of the expected value over a short period of time, and perform an optimum route allocation at high speed. Therefore, the management server 10-1 can perform a real-time response with respect to the route change request from the edge node, and suppress a delay to thereby improve communication efficiency.

The above-described processing function of the route allocation apparatus 10 can be realized by a computer. In that case, a program (route allocation program) in which a processing content of the functions to be maintained by the route allocation apparatus 10 is described is provided. The computer realizes, when executing the program, the above-described processing function. The program in which the processing content is described can be recorded in a computer-readable recording medium.

A computer is entirely controlled by a CPU.

Connected to the CPU via a bus are a RAM, a hard disk drive, a communication interface, a graphics processing unit, and an input-output interface.

The RAM temporarily stores at least part of an OS (Operating System) program and programs for performing the route allocation to be executed by the CPU. The RAM also temporarily stores various kinds of data necessary for CPU processing. The HDD stores the OS program and the application programs.

The communication interface is connected to the network. The communication interface communicates data with another computer via the network. Connected to the graphics processing unit is a monitor to display images thereon under the control of the CPU.

Connected to the input-output interface are a keyboard and a mouse, and is designed to transfer signals from the keyboard and the mouse to the CPU via the bus. Further, the input-output interface can be connected to an external storage interface capable of writing information in an external storage and reading information from the external storage.

The route allocation apparatus 10 executes, by using a computer, a program having described therein a processing content of the functions to be maintained by the route allocation apparatus to thereby realize it. That is, a processing content corresponding to the functions of the route calculation section 11 and the route allocation controller 12 of FIG. 1 is described as a program. Here, the described program can be recorded in a computer-readable recording medium.

Examples of the computer-readable recording medium include a magnetic recording system, an optical disk, a magneto-optical recording medium, and a semiconductor memory. Examples of the magnetic recording system include a hard disk drive (HDD), a floppy disk (FD), and a magnetic tape. Examples of the optical disk include a DVD, a DVD- RAM, a CD-ROM, and a CD-R/RW. Examples of the magneto-optical recording medium include an MO (Magneto-Optical disk).

In case of distribution of programs, portable recording media, such as DVD and CD-ROM with the programs recorded are sold. Also, programs are stored in a storage device of a server computer, and the programs can be transferred to other computers from the server computer via a network.

Further, at least part of the above-described processing functions can be realized by an electronic circuit such as a DSP (Digital Signal Processor), an ASIC (Application Specific Integrated Circuit), and a PLD (Programmable Logic Device).

A computer which executes programs stores in its own storage device, for example, programs recorded in an external recording medium, or programs transferred from the server computer. The computer reads the programs from its own storage device to execute a processing according to the programs. In addition, the computer can read the programs directly from an external recording medium to execute a processing according to the programs. Also, the computer can also execute a processing sequentially according to the received programs each time a program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. A computer-readable, non-transitory medium storing a route allocation program which causes a computer to perform a procedure comprising:
    obtaining a route between an outgoing edge node and an incoming edge node within a network; and
    allocating the route to a communication slot,
    wherein:
    in the allocating, an expected value is calculated as an index of the number of the routes allocatable to the communication slot, and a route allocation in which the expected value is a maximum is selected; and
    after the allocating, the number of the routes allocatable to the selected communication slot is calculated, and the expected value is updated.

2. The computer-readable, non-transitory medium according to claim 1, wherein in the allocating, the expected value is calculated in accordance with an equation (1):

[Equation 1]

$$ei, j = \left( \sum_{k=1, k \neq j}^{N} ak + bi, j \right) / (L \times N) \quad (1)$$

where ei,j is the expected value for allocation of a route with a number i to a communication slot with a number j, a parameter aj is the number of the routes allocatable to the communication slot j in a present route allocation state, a parameter bi,j is the number of the routes allocatable to the communication slot j when allocating the route i to the communication slot j in the present route allocation state, N is the number of the communication slots, and L is the number of the routes.

3. The computer-readable, non-transitory medium according to claim 2,
    wherein when allocating a route with a number I to a communication slot with a number J, a value aJ is replaced by a value bI,J, a parameter bi,J ($1 \leq i \leq L$) after the route allocation is obtained, and the expected value ei,j is recalculated to update the expected value.

4. A computer-readable, non-transitory medium storing a route allocation program which causes a computer to perform a procedure comprising:
    obtaining a route between an outgoing edge node and an incoming edge node within an optical network; and
    allocating the route to a wavelength,
    wherein:
    in the allocating, an expected value is obtained as an index of the number of the routes allocatable to the wavelength, and a route allocation in which the expected value is a maximum is selected; and
    after the allocating, the number of the routes allocatable to the selected wavelength is obtained, and the expected value is updated.

5. The computer-readable, non-transitory medium according to claim 4, wherein in the allocating, the expected value is calculated in accordance with an equation (2):

[Equation 2]

$$ei, j = \left( \sum_{k=1, k \neq j}^{N} ak + bi, j \right) / (L \times W) \quad (2)$$

where ei,j is the expected value for allocation of a route with a number i to a wavelength with a number of j, a parameter aj is the number of the routes allocatable to the wavelength j in a present route allocation state, a parameter bi,j is the number of the routes allocatable to the wavelength j when allocating the route i to the wavelength j in the present route allocation state, W is the number of the wavelengths, and L is the number of the routes.

6. The computer-readable, non-transitory medium according to claim 5, wherein when allocating a route with a number I to a wavelength with a number J, a value aJ is replaced by a value bI,J, a parameter bi,J ($1 \leq i \leq L$) after the route allocation is obtained, and the expected value ei,j is recalculated to update the expected value.

7. A route allocation method executed by a computer, the method comprising:
    obtaining a route between an outgoing edge node and an incoming edge node within a network; and
    allocating the route to a communication slot,
    wherein:
    in the allocating, an expected value is calculated as an index of the number of the routes allocatable to the communication slot, and a route allocation in which the expected value is a maximum is selected; and
    after the allocating, the number of the routes allocatable to the selected communication slot is calculated, and the expected value is updated.

8. The route allocation method according to claim 7, wherein in the allocating, the expected value is calculated in accordance with an equation (1):

[Equation 1]

$$ei,j = \left(\sum_{k=1,k\neq j}^{N} ak + bi, j\right) / (L \times N) \quad (1)$$

where ei,j is the expected value for allocation of a route with a number i to a communication slot with a number j, a parameter aj is the number of the routes allocatable to the communication slot j in a present route allocation state, a parameter bi,j is the number of the routes allocatable to the communication slot j when allocating the route i to the communication slot j in the present route allocation state, N is the number of the communication slots, and L is the number of the routes.

9. The route allocation method according to claim 8, wherein when allocating a route with a number I to a communication slot with a number J, a value aJ is replaced by a value bI,J, a parameter bi,J ($1 \leq i \leq L$) after the route allocation is obtained, and the expected value ei,j is recalculated to update the expected value.

* * * * *